(12) United States Patent
Kim et al.

(10) Patent No.: US 10,787,567 B2
(45) Date of Patent: Sep. 29, 2020

(54) THERMOPLASTIC RESIN COMPOSITION AND MOLDED PRODUCT COMPRISING SAME

(71) Applicant: LOTTE ADVANCED MATERIALS CO., LTD., Yeosu-si (KR)

(72) Inventors: Pil Ho Kim, Uiwang-si (KR); Su Ji Kim, Uiwang-si (KR); Sun Young Kim, Uiwang-si (KR); Seung Shik Shin, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 92 days.

(21) Appl. No.: 15/773,298

(22) PCT Filed: Dec. 13, 2016

(86) PCT No.: PCT/KR2016/014603
§ 371 (c)(1),
(2) Date: May 3, 2018

(87) PCT Pub. No.: WO2017/116043
PCT Pub. Date: Jul. 6, 2017

(65) Prior Publication Data
US 2018/0319979 A1    Nov. 8, 2018

(30) Foreign Application Priority Data

Dec. 30, 2015 (KR) .................. 10-2015-0190388

(51) Int. Cl.
| | |
|---|---|
| *C08L 69/00* | (2006.01) |
| *C08L 83/04* | (2006.01) |
| *C08L 27/18* | (2006.01) |
| *C08K 5/42* | (2006.01) |
| *C08K 3/34* | (2006.01) |
| *C08L 23/28* | (2006.01) |
| *C08K 3/36* | (2006.01) |

(52) U.S. Cl.
CPC .............. *C08L 69/00* (2013.01); *C08K 3/346* (2013.01); *C08K 3/36* (2013.01); *C08K 5/42* (2013.01); *C08L 23/28* (2013.01); *C08L 83/04* (2013.01); *C08L 27/18* (2013.01); *C08L 2201/02* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 7,060,780 | B2 | 6/2006 | Miyamoto et al. |
| 7,183,342 | B2 | 2/2007 | Miyamoto et al. |
| 8,013,105 | B2 | 9/2011 | Isozaki et al. |
| 9,287,471 | B2 | 3/2016 | de Brouwer et al. |
| 9,299,898 | B2 | 3/2016 | de Brouwer et al. |
| 2002/0099160 | A1* | 7/2002 | Shiping ................. C08K 5/523 528/10 |
| 2005/0256227 | A1 | 11/2005 | Miyamoto et al. |
| 2010/0069543 | A1 | 3/2010 | Monden et al. |
| 2011/0052895 | A1 | 3/2011 | Li et al. |
| 2012/0129993 | A1 | 5/2012 | Ha et al. |
| 2013/0270591 | A1 | 10/2013 | de Brouwer et al. |
| 2014/0295363 | A1 | 10/2014 | Sun et al. |
| 2015/0210850 | A1 | 7/2015 | Yamada et al. |
| 2015/0353732 | A1* | 12/2015 | Wang ...................... C08L 83/04 524/141 |

FOREIGN PATENT DOCUMENTS

| | | |
|---|---|---|
| CN | 100381488 C | 4/2008 |
| CN | 101522805 A | 9/2009 |
| CN | 101578335 A | 11/2009 |
| CN | 102558812 B | 1/2015 |
| CN | 104540896 A | 4/2015 |
| CN | 104672830 A | 6/2015 |
| JP | 2008-222813 A | 9/2008 |
| JP | 2012-184345 A | 9/2012 |
| JP | 2010-229192 A | 10/2012 |
| KR | 10-2014-0095465 A | 8/2014 |
| WO | 2008/047672 A1 | 4/2008 |
| WO | 2013/130610 A1 | 9/2013 |
| WO | 2014/034012 A1 | 3/2014 |
| WO | 2017/116043 A1 | 7/2017 |

OTHER PUBLICATIONS

Search Report in counterpart European Application No. 16881995.1 dated Dec. 19, 2018, pp. 1-12.
Rui-Juan Zhou et al: "Optical properties of particle-filled polycarbonate, polystyrene, and poly(methyl methacrylate) composites", Journal of Applied Polymer Science, vol. 115, No. 3, Feb. 5, 2010 (Feb. 5, 2010), pp. 1866-1872, XP055531506, US.
Xiaomin Zhao et al: "Effect of talc on thermal stability and flame retardancy of polycarbonate/PSBPBP composite", Journal of Applied Polymer Science, vol. 125, No. 4, Aug. 15, 2012 (Aug. 15, 2012), pp. 3167-3174, XP055532233, US.
Ilpo Niskanen et al: "Estimation of Effective Refractive Index of Birefringent Particles Using a Combination of the Immersion Liquid Method and Light Scattering", Applied Spectroscopy., vol. 62, No. 4, Apr. 1, 2008 (Apr. 1, 2008), pp. 399-401, XP055532163, US.

(Continued)

*Primary Examiner* — Tae H Yoon
(74) *Attorney, Agent, or Firm* — Additon, Higgins & Pendleton, P.A.

(57) ABSTRACT

A thermoplastic resin composition of the present invention contains: a polycarbonate resin; a siloxane copolymer comprising a repeat unit represented by chemical formula 1 and a repeat unit represented by chemical formula 2; a metal aromatic sulfonate; a fluorinated olefin-based resin; and an inorganic filler having a difference in refractive index with the polycarbonate resin of approximately 0-0.01. The thermoplastic resin composition has excellent flame retardancy, transparency, stiffness, heat resistance, balance of these physical properties, and the like.

10 Claims, No Drawings

(56) References Cited

OTHER PUBLICATIONS

"ASTM D 1525-00: Standard Test Method for Vicat Softening Temperature of Plastics" In: "ASTM D 1525-00: Standard Test Method for Vicat Softening Temperature of Plastics" May 1, 2000 (May 1, 2000), ASTM, XP055532247.
Anonymous: "ASTM D1003-13 Standard Test Method for Haze and Luminous Transmittance of Transparent Plastics", ASTM Book of Standards vol. 08.01, vol. 8.01, Jan. 1, 2013 (Jan. 1, 2013), pp. 222-228, XP009506130, DOI: 10. 1520/D1003.
J.P. Wu et al: "Skew Stretched Polycarbonate Films", Intern. Polymer Processing, vol. VII, No. 2, Jan. 1, 1992 (Jan. 1, 1992), pp. 151-158, XP055532490.
International Search Report in counterpart International Application No. PCT/KR2016/014603 dated Mar. 20, 2017, pp. 1-6.
Office Action in counterpart Chinese Application No. 201680074072.8 dated Sep. 25, 2019, pp. 1-8.
Office Action in counterpart Japanese Application No. 2018-518732 dated Aug. 4, 2020, pp. 1-5.

\* cited by examiner

THERMOPLASTIC RESIN COMPOSITION AND MOLDED PRODUCT COMPRISING SAME

CROSS-REFERENCE TO RELATED APPLICATIONS

This application claims priority to and the benefit of International Application No. PCT/KR2016/014603, filed Dec. 13, 2016, which published as WO 2017/116043 on Jul. 6, 2017; and Korean Patent Application No. 10-2015-0190388, filed in the Korean Intellectual Property Office on Dec. 30, 2015, the entire disclosure of each of which is incorporated herein by reference.

TECHNICAL FIELD

The present invention relates to a thermoplastic resin composition and a molded product comprising the same. More particularly, the present invention relates to a thermoplastic resin composition that has good properties in terms of flame retardancy, transparency, stiffness, thermal resistance, and the like, and a molded product comprising the same.

BACKGROUND ART

Polycarbonate resins are engineering plastics having good properties in terms of mechanical strength, thermal resistance, transparency, and the like. Typically, such polycarbonate resins are widely used in various fields, for example, office automation products, electric/electronic products, construction materials, and the like. Particularly, in order to be applied to transparent exterior materials for electric/electronic products, the polycarbonate resins are required to have high flame retardancy, transparency, and the like, and are also required to have high stiffness to satisfy a current trend of slimness and thin thickness of electric/electronic products, such as televisions, monitors, notebook computers, and the like.

In order for a thermoplastic resin composition comprising a polycarbonate resin to realize good properties in terms of flame retardancy, stiffness, and the like, an anti-dripping agent such as a fluorinated polyolefin resin, fillers such as glass fibers, and the like are added to the resin composition in addition to the polycarbonate resin. However, when the anti-dripping agent and the fillers are used in excess amounts for the purpose of realizing flame retardancy and stiffness suitable for thin exterior materials, the thermoplastic resin composition can suffer from deterioration in transparency, impact resistance, processability, and the like.

Therefore, there is a need for development of a thermoplastic resin composition which has good properties in terms of flame retardancy, transparency, stiffness, thermal resistance, and balance therebetween to be applicable to thin exterior materials.

The background technique of the present invention is disclosed in Korean Patent Laid-open Publication No. 2014-0095465 and the like.

DISCLOSURE

Technical Problem

It is one object of the present invention to provide a thermoplastic resin composition exhibiting good properties in terms of flame retardancy, transparency, stiffness, and balance therebetween, and a molded product comprising the same.

It is another object of the present invention to provide a thermoplastic resin composition having good thermal resistance and a molded product comprising the same.

The above and other objects of the present invention can be achieved by the present invention described below.

Technical Solution

One aspect of the present invention relates to a thermoplastic resin composition. The thermoplastic resin composition includes: a polycarbonate resin; a siloxane copolymer including a repeat unit represented by Formula 1 and a repeat unit represented by Formula 2; an aromatic sulfonic acid metal salt; a fluorinated olefin resin; and inorganic fillers having a refractive index difference of about 0 to about 0.01 with respect to the polycarbonate resin:

[Formula 1]

in Formula 1, $R_1$ and $R_2$ are each independently a $C_1$ to $C_{10}$ alkyl group; and

[Formula 2]

in Formula 2, $R_3$ and $R_4$ are each independently a $C_1$ to $C_{10}$ alkyl group or a $C_6$ to $C_{12}$ aryl group and at least one of $R_3$ and $R_4$ is an aryl group.

In some embodiments, the thermoplastic resin composition may include about 100 parts by weight of the polycarbonate resin, about 0.01 to about 1 part by weight of the siloxane copolymer, about 0.01 to about 5 parts by weight of the aromatic sulfonic acid metal salt, about 0.01 to about 0.4 parts by weight of the fluorinated olefin resin, and about 0.1 to about 5 parts by weight of the inorganic fillers.

In some embodiments, the polycarbonate resin may have a weight average molecular weight (Mw) of about 10,000 g/mol to about 200,000 g/mol.

In some embodiments, the siloxane copolymer may contain about 30 mol % to about 50 mol % of the aryl group based on 100 mol % of the total substituents.

In some embodiments, the siloxane copolymer may include at least one of poly(dialkylsiloxane-co-arylalkylsiloxane) and poly(dialkylsiloxane-co-diarylsiloxane).

In some embodiments, the siloxane copolymer may have a viscosity of about 1 cSt to about 500 cSt at 25° C.

In some embodiments, the aromatic sulfonic acid metal salt may be represented by Formula 3:

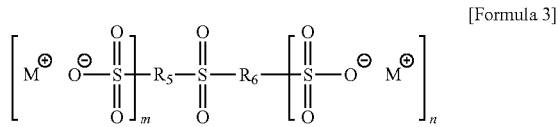

[Formula 3]

in Formula 3, $R_5$ and $R_6$ are each independently a $C_1$ to $C_{20}$ hydrocarbon group; each M is independently lithium (Li), sodium (Na) or potassium (K); m is an integer of 0 to 6; and n is an integer of 1 to 6.

In some embodiments, the thermoplastic resin composition may have a flame retardancy of V-0 or higher, as measured on a 1.5 mm thick specimen in accordance with a UL-94 vertical test method.

In some embodiments, the thermoplastic resin composition may have a transmittance of about 82% to about 95%, as measured on a 1.0 mm thick specimen in accordance with ASTM D1003.

In some embodiments, the thermoplastic resin composition may have a Vicat softening temperature (VST) of about 140° C. or more, as measured at a heating rate of 50° C./hr under a load of 5 kg in accordance with ISO R306.

Another aspect of the present invention relates to a molded product produced from the thermoplastic resin composition.

Advantageous Effects

The present invention provides a thermoplastic resin composition, which has good properties in terms of flame retardancy, transparency, stiffness, thermal resistance, and balance therebetween, and a molded product comprising the same.

BEST MODE

Hereinafter, embodiments of the present invention will be described in detail.

A thermoplastic resin composition according to the present invention includes (A) a polycarbonate resin; (B) a siloxane copolymer; (C) an aromatic sulfonic acid metal salt; (D) a fluorinated olefin resin; and (E) inorganic fillers.

(A) Polycarbonate Resin

According to embodiments of the present invention, the polycarbonate resin may be selected from typical thermoplastic polycarbonate resins known in the art. For example, the polycarbonate resin may be an aromatic polycarbonate resin prepared by reacting at least one diphenol (aromatic dihydroxy compound) with a carbonate precursor, such as phosgene, halogen formate, and diester carbonate.

In some embodiments, the diphenols may include 4,4'-biphenol, 2,2-bis(4-hydroxylphenyl)propane, 2,4-bis(4-hydroxylphenyl)-2-methylbutane, 1,1-bis(4-hydroxylphenyl)cyclohexane, 2,2-bis(3-chloro-4-hydroxylphenyl)propane, 2,2-bis(3,5-dichloro-4-hydroxylphenyl)propane, and mixtures thereof, without being limited thereto. For example, the diphenols may be 2,2-bis(4-hydroxylphenyl)propane, 2,2-bis(3,5-dichloro-4-hydroxylphenyl)propane, or 1,1-bis(4-hydroxylphenyl)cyclohexane, specifically, 2,2-bis(4-hydroxyphenyl)propane, which is also referred to as bisphenol A.

The polycarbonate resin may have a branched chain. For example, the polycarbonate resin may include a polycarbonate resin prepared by adding about 0.05 mol % to about 2 mol % of a trivalent or higher polyfunctional compound, for example, a trivalent or higher phenol group-containing compound, based on the total amount of the diphenols used in polymerization. The polycarbonate resin may be a homopolycarbonate resin, a copolycarbonate resin, or a blend thereof. In addition, a polycarbonate resin may be partially or completely replaced by an aromatic polyester-polycarbonate resin obtained by polymerization in the presence of an ester precursor, for example, a bifunctional carboxylic acid.

In some embodiments, the polycarbonate resin may have a weight average molecular weight (Mw) of about 10,000 g/mol to about 200,000 g/mol, for example, about 15,000 g/mol to about 80,000 g/mol, as measured by gel permeation chromatography (GPC). Within this range, the thermoplastic resin composition can have good properties in terms of processability, mechanical properties, and the like.

In some embodiments, the polycarbonate resin may have an index of refraction of about 1.58 to about 1.59, for example, about 1.581 to about 1.587. Within this range, the thermoplastic resin composition can exhibit good transparency.

(B) Siloxane Copolymer

According to embodiments of the present invention, the siloxane copolymer is obtained by substituting some alkyl groups of a polydialkylsiloxane with an aryl group, and includes a repeat unit represented by Formula 1 and a repeat unit represented by Formula 2.

[Formula 1]

In Formula 1, $R_1$ and $R_2$ are each independently a $C_1$ to $C_{10}$ alkyl group, for example, a methyl group, an ethyl group, a propyl group, a butyl group, and a tert-butyl group.

[Formula 2]

In Formula 2, $R_3$ and $R_4$ are each independently a $C_1$ to $C_{10}$ alkyl group, for example, a methyl group, an ethyl group, a propyl group, a butyl group, and a tert-butyl group, or a $C_6$ to $C_{12}$ aryl group, for example, a phenyl group, a benzyl group, a tolyl group, an o-xylyl group, and an m-xylyl group, and at least one of $R_3$ and $R_4$ is an aryl group.

Generally, a polydialkylsiloxane, such as polydimethylsiloxane, has a low glass transition temperature (Tg) and thus is used as an impact modifier to improve low-temperature impact strength of a thermoplastic resin composition. However, due to a large difference in index of refraction between the polydialkylsiloxane and the polycarbonate resin, the thermoplastic resin composition suffers from significant deterioration in transparency even with a small amount of the polydialkylsiloxane. Thus, according to the present invention, the thermoplastic resin composition includes a siloxane copolymer containing an aryl group instead of the polydialkylsiloxane in order to reduce a difference in index of refraction with respect to the polycarbonate resin while securing good properties in terms of transparency, impact resistance, and the like.

In some embodiments, the siloxane copolymer may contain about 30 mol % to about 50 mol %, for example, about 35 mol % to about 45 mol %, of the aryl group based on 100 mol % of the total substituents $R_1$, $R_2$, $R_3$ and $R_4$. Within this range, the thermoplastic resin composition can exhibit good properties in terms of transparency, external appearance, impact resistance, and the like.

In some embodiments, the siloxane copolymer may include a poly(dialkylsiloxane-co-arylalkylsiloxane) such as poly(dimethylsiloxane-co-phenylmethylsiloxane); a poly(dialkylsiloxane-co-diarylsiloxane) such as poly(dimethylsiloxane-co-diphenylsiloxane); and combinations thereof. Specifically, the poly(dialkylsiloxane-co-arylalkylsiloxane) may be a siloxane copolymer wherein each of $R_1$ and $R_2$ of Formula 1 is an alkyl group, $R_3$ of Formula 2 is an aryl group, and $R_4$ of Formula 2 is an alkyl group, and the poly(dialkylsiloxane-co-diarylsiloxane) may be a siloxane copolymer wherein each of $R_1$ and $R_2$ of Formula 1 is an alkyl group and each of $R_3$ and $R_4$ of Formula 2 is an aryl group.

In some embodiments, the siloxane copolymer may have a viscosity of about 1 cSt (centistokes) to about 500 cSt, for example, about 4 cSt to about 300 cSt, as measured at 25° C. using an Ubbelohde viscometer. Within this range, the thermoplastic resin composition can exhibit good properties in terms of impact resistance, transparency, flame retardancy, and the like.

In some embodiments, the siloxane copolymer may have an index of refraction of about 1.57 to about 1.59, for example, about 1.575 to about 1.585, and a difference in index of refraction of about 0.01 or less, for example, about 0.001 to about 0.01, specifically about 0.002 to about 0.008, with respect to the polycarbonate resin. Within this range, the polycarbonate resin composition can have good transparency.

In some embodiments, the siloxane copolymer may be present in an amount of about 0.01 to about 1 part by weight, for example, about 0.1 to about 0.7 parts by weight, in about 100 parts by weight of the polycarbonate resin. Within this range, the thermoplastic resin composition can exhibit good properties in terms of impact resistance, transparency, thermal resistance, and the like.

(C) Aromatic Sulfonic Acid Metal Salt

According to embodiments of the present invention, the aromatic sulfonic acid metal salt serves to reduce decomposition of the polycarbonate resin upon processing while enhancing flame retardancy, thermal stability, stiffness and other properties of the thermoplastic resin composition, and may be represented by Formula 3.

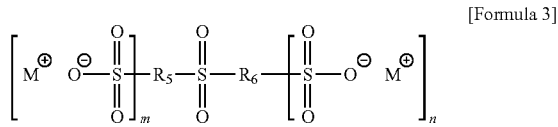
[Formula 3]

In Formula 3, $R_5$ and $R_6$ are each independently a $C_1$ to $C_{20}$ hydrocarbon group, for example, a $C_1$ to $C_{20}$ alkylene group or a $C_6$ to $C_{25}$ arylene group, specifically a methylene group, an ethylene group, a propylene group, a butylene group, a hexylene group, a phenylene group, a naphthylene group, and an alkyl-substituted phenylene group; each M is independently lithium (Li), sodium (Na) or potassium; m is an integer of 0 to 6; and n is an integer of 1 to 6. Here, if m is 0, $R_5$ may be, for example, a $C_1$ to $C_{20}$ alkyl group or a $C_6$ to $C_{25}$ aryl group.

In some embodiments, the aromatic sulfonic acid metal salt may include a metal salt of diphenyl sulfone-3-sulfonic acid, a metal salt of diphenyl sulfone-4-sulfonic acid, a metal salt of diphenyl sulfone-3,3'-disulfonic acid, a metal salt of diphenyl sulfone-3,4'-disulfonic acid, and the like.

In some embodiments, the aromatic sulfonic acid metal salt may have an average particle diameter of about 50 μm to about 500 μm, for example, about 150 μm to about 350 μm. Within this range, the aromatic sulfonic acid metal salt can improve thermal stability, flame retardancy and stiffness of the thermoplastic resin composition and a molded product produced from the thermoplastic resin composition does not suffers from increase in surface roughness due to agglomeration of the particles.

In some embodiments, the aromatic sulfonic acid metal salt may be present in an amount of about 0.01 to about 5 parts by weight, for example, about 0.05 to about 2 parts by weight, relative to about 100 parts by weight of the polycarbonate resin. Within this range, the thermoplastic resin composition can have good properties in terms of flame retardancy, thermal stability, stiffness, external appearance, and the like.

In some embodiments, the siloxane copolymer (B) and the aromatic sulfonic acid metal salt (C) may be present in a weight ratio (B:C) of about 3:1 to about 1:1. Within this range, the thermoplastic resin composition can have good properties in terms of flame retardancy, heat resistance, and the like.

(D) Fluorinated Olefin Resin

According to embodiments of the present invention, the fluorinated olefin resin serves to form a fibrillar network in the resin composition upon extrusion of the thermoplastic resin composition, to reduce viscosity of the thermoplastic resin composition in a molten state upon combustion thereof, and to prevent a dripping phenomenon by increasing shrinkage rate. Example of the fluorinated olefin resin may include polytetrafluoroethylene, polyvinylidene fluoride, tetrafluoroethylene/vinylidene fluoride copolymer, tetrafluoroethylene/hexafluoropropylene copolymer, ethylene/tetrafluoroethylene copolymer, and combinations thereof, without being limited thereto. For example, polytetrafluoroethylene (Product Name: Teflon®) having a particle diameter of about 0.05 μm to about 1,000 μm and a specific gravity of about 1.2 g/cm³ to about 2.3 g/cm³ may be used.

In some embodiments, the fluorinated olefin resin may be prepared by a well-known polymerization method, for example, in an aqueous medium containing a free-radical formation catalyst, such as sodium, potassium, ammonium peroxydisulfate, and the like.

In some embodiments, the fluorinated olefin resin may be used in an emulsion state or in a powdered state. Since the fluorinated olefin resin in an emulsion state has a problem of a complicated preparation process despite good dispersion, it is desirable that the fluorinated olefin resin be used in a powdered state so long as the fluorinated olefin resin can be suitably dispersed even in the powdered state.

In some embodiments, the fluorinated olefin resin may be present in an amount of about 0.01 to about 0.4 parts by weight, for example, about 0.05 to about 0.3 parts by weight, relative to about 100 parts by weight of the polycarbonate resin. Within this range, the thermoplastic resin composition can have good properties in terms of flame retardancy, transparency, processability, and the like.

In some embodiments, the aromatic sulfonic acid metal salt (C) and the fluorinated olefin resin (D) may be present in a weight ratio (C:D) of about 0.5:1 to about 3:1. Within this range, the thermoplastic resin composition can have further improved transparency.

(E) Inorganic Fillers

According to embodiments of the present invention, the inorganic fillers serve to enhance mechanical properties, such as stiffness and the like, of the thermoplastic resin composition without deterioration in transparency of the polycarbonate resin, and a difference in index of refraction between the inorganic fillers and the polycarbonate resin may be about 0 to about 0.01, for example, about 0 to about 0.008. If the difference in index of refraction between the inorganic fillers and the polycarbonate resin exceeds about 0.01, there can be a problem of significant deterioration in transparency of the thermoplastic resin composition. The inorganic fillers may be selected from any inorganic fillers well-known to those skilled in the art without being limited to a particular shape and a particular kind, so long as the inorganic fillers satisfy the above difference in index of refraction with respect to the polycarbonate resin.

In some embodiments, the inorganic fillers may include talc, wollastonite, whisker, silica, mica, and mixtures thereof. Such inorganic fillers may have various cross-sectional shapes, such as a circular cross-sectional shape, an elliptical cross-sectional shape, a rectangular cross-sectional shape, and the like.

In some embodiments, the inorganic fillers may be fiber type fillers, flake type fillers, and the like. For example, the fiber type inorganic fillers may have a cross-sectional diameter of about 5 μm to about 20 μm and a pre-machining length of about 2 mm to about 5 mm, and the flake-type inorganic fillers may have a cross-sectional diameter of about 1.5 μm to about 10 μm and a pre-machining length of about 2 mm to about 5 mm. Within this range, the thermoplastic resin composition can have good processability and a molded product produced therefrom can have improved properties in terms of not only mechanical properties such as stiffness, but also external appearance.

In some embodiments, the inorganic fillers may be coated with a surface treatment agent for the purpose of increasing coupling force to the polycarbonate resin. Examples of the surface treatment agent may include a silane compound, a urethane compound, and an epoxy compound, without being limited thereto.

In some embodiments, the inorganic fillers may be present in an amount of about 0.1 to about 5 parts by weight, for example, about 0.5 to about 1.5 parts by weight, relative to about 100 parts by weight of the polycarbonate resin. Within this range, the thermoplastic resin composition can have good properties in terms of flame retardancy, transparency, stiffness, and the like.

In some embodiments, the thermoplastic resin composition may further include typical additives, as needed. Examples of the additives may include flame retardants, flame retardant aids, antioxidants, lubricants, release agents, nucleating agents, antistatic agents, stabilizers, pigments, dyes, and mixtures thereof, without being limited thereto. The additive may be present in an amount of about 0.01 to about 20 parts by weight, relative to about 100 parts by weight of the polycarbonate resin, without being limited thereto.

In some embodiments, the thermoplastic resin composition may have a flame retardancy of V-0 or higher, as measured on a 1.5 mm thick specimen in accordance with a UL-94 vertical test method.

In some embodiments, the thermoplastic resin composition may have a transmittance of about 82% to about 95%, for example, about 82% to about 90%, as measured on a 1.0 mm thick specimen in accordance with ASTM D1003.

In some embodiments, the thermoplastic resin composition may have a Vicat softening temperature (VST) of about 140° C. or more, for example, about 143° C. to about 160° C., as measured under conditions of a load of 5 kg and a heating rate of 50° C./hr in accordance with ISO R306.

A molded product according to the present invention is produced from the thermoplastic resin composition. The thermoplastic resin composition according to the embodiments of the present invention may be prepared by any known method for preparing a thermoplastic resin composition. For example, the aforementioned components and, optionally, other additives are mixed, followed by melt extrusion in an extruder, thereby preparing a thermoplastic resin composition in pellet or chip form. The prepared pellets or chips of the thermoplastic resin composition may be produced into various molded products (products) by various molding methods, such as injection molding, extrusion molding, vacuum molding, and casting. Such molding methods are well known to those skilled in the art. The molded product according to the present invention has good flame retardancy even with a thin thickness and good properties in terms of transparency, stiffness, thermal resistance, and balance therebetween, and thus can be advantageously used for automobile parts, electric/electronic products, and interior/exterior materials.

Mode for Invention

Next, the present invention will be described in more detail with reference to some examples. It should be understood that these examples are provided for illustration only and are not to be in any way construed as limiting the present invention.

EXAMPLE

Details of components used in Examples and Comparative Examples are as follows.

(A) Polycarbonate Resin

A bisphenol-A type polycarbonate resin (index of refraction of: 1.583, weight average molecular weight: 25,000 g/mol) was used.

(B) Siloxane Copolymer

Poly(dimethylsiloxane-co-diphenylsiloxane) (Manufacturer: GE Toshiba Co., Ltd., Product Name: TSF-437, Index of refraction of: 1.58 (theoretical value), viscosity: 22 cSt) was used.

(C) Aromatic Sulfonic Acid Metal Salt

Potassium diphenyl sulfone-3-sulfonate (Manufacturer: Seal Sands Chemicals Co., Ltd., Product Name: KSS) was used.

(D) Fluorinated Olefin Resin

Polytetrafluoroethylene (Manufacturer: DuPont, Product Name: CFP 614A) was used.

(E) Inorganic Fillers (E1) Talc having an index of refraction of 1.58 (Manufacturer: Hayashi Kasei Co., Ltd., Product Name: HS-T 0.5) was used.

(E2) Kaolin having an index of refraction of 1.533 (Manufacturer: Australian China Clays Limited, Product Name: Microbrite C80/95 C1) was used.

Examples 1 to 4 and Comparative Examples 1 to 3

The above components were placed in amounts as listed in Table 1 in a tumbler mixer and mixed for 10 minutes. Then, the mixture was added to a twin-screw extruder (L/D=44, diameter: 45 mm) and subjected to melt-extrusion at a temperature of 240° C. to 300° C. and a stirring rate of 250 rpm, thereby preparing a thermoplastic resin composition in chip form. The prepared chips were dried at 80° C. for 5 hours or more and injection-molded in a screw-type injection molding machine (Manufacturer: LG Cable & System, Product Name: LGH-140N) at a temperature of 240° C. to 300° C., thereby preparing specimens. The prepared specimens were evaluated as to the following properties by the following method, and results are shown in Table 1.

Property Evaluation (1) Flame retardancy: Flame retardancy was measured on a 1.5 mm thick specimen in accordance with the UL9-4 vertical test method.

(2) Transmittance (unit: %): Transmittance was measured on a 1.0 mm thick specimen using a haze meter (YDP02-0D, Nippon Denshoku Co., Ltd.) in accordance with ASTM D1003.

(3) Thermal resistance: Vicat softening temperature (VST) (unit: ° C.) was measured under conditions of a load of 5 kg and a heating rate of 50° C./hr in accordance with ISO R306.

TABLE 1

|  |  | Example |  |  |  | Comparative Example |  |  |
|---|---|---|---|---|---|---|---|---|
|  |  | 1 | 2 | 3 | 4 | 1 | 2 | 3 |
| (A) (parts by weight) |  | 100 | 100 | 100 | 100 | 100 | 100 | 100 |
| (B) (parts by weight) |  | 0.3 | 0.3 | 0.5 | 0.3 | 0.3 | 0.3 | 0.3 |
| (C) (parts by weight) |  | 0.1 | 0.3 | 0.3 | 0.3 | 0.3 | — | 0.3 |
| (D) (parts by weight) |  | 0.2 | 0.2 | 0.2 | 0.1 | 0.2 | 0.2 | — |
| (E) (parts by weight) | (E1) | 1 | 1 | 1 | 1 | — | 1 | 1 |
|  | (E2) | — | — | — | — | 1 | — | — |
| Flame retardancy (1.5 mm) |  | V-0 | V-0 | V-0 | V-0 | V-1 | fail | fail |
| Transmittance (%) |  | 83.2 | 82.8 | 82.5 | 83.7 | 74.3 | 82.3 | 82.4 |
| Thermal resistance (VST, ° C.) |  | 144.2 | 144.5 | 144.1 | 144.3 | 143.8 | 144.5 | 145.6 |

From the results, it could be seen that the thermoplastic resin compositions according to the present invention had good properties in terms of flame retardancy, transparency, thermal resistance, and balance therebetween.

Conversely, it could be seen that the thermoplastic resin composition of Comparative Example 1 prepared using inorganic fillers having a difference in index of refraction of greater than 0.01 with respect to the polycarbonate resin exhibited deterioration in transparency and flame retardancy; and the thermoplastic resin composition of Comparative Example 2 prepared without using the aromatic sulfonic acid metal salt and the thermoplastic resin composition of Comparative Example 3 prepared without using inorganic fillers suffered from significant deterioration in flame retardancy.

It should be understood that various modifications, changes, alterations, and equivalent embodiments can be made by those skilled in the art without departing from the spirit and scope of the invention.

The invention claimed is:

1. A thermoplastic resin composition comprising:
   a polycarbonate resin;
   a siloxane copolymer comprising a repeat unit represented by Formula 1 and a repeat unit represented by Formula 2, wherein the siloxane copolymer has a viscosity of about 1 cSt to about 500 cSt at 25° C.;
   an aromatic sulfonic acid metal salt;
   a fluorinated olefin resin; and
   inorganic fillers having a refractive index difference of about 0 to about 0.01 with respect to the polycarbonate resin:

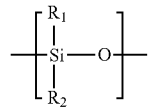

[Formula 1]

wherein in Formula 1, $R_1$ and $R_2$ are each independently a $C_1$ to $C_{10}$ alkyl group; and

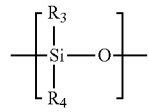

[Formula 2]

wherein in Formula 2, $R_3$ and $R_4$ are each independently a $C_1$ to $C_{10}$ alkyl group or a $C_6$ to $C_{12}$ aryl group, with the proviso that at least one of $R_3$ and $R_4$ is a $C_6$ to $C_{12}$ aryl group,
wherein the thermoplastic resin composition has a flame retardancy of V-0 or higher, as measured on a 1.5 mm thick specimen in accordance with a UL-94 vertical test method and a transmittance of about 82% to about 95%, as measured on a 1.0 mm thick specimen in accordance with ASTM D1003.

2. The thermoplastic resin composition according to claim 1, comprising:
   about 100 parts by weight of the polycarbonate resin; about 0.01 to about 1 part by weight of the siloxane copolymer; about 0.01 to about 5 parts by weight of the aromatic sulfonic acid metal salt; about 0.01 to about 0.4 parts by weight of the fluorinated olefin resin; and about 0.1 to about 5 parts by weight of the inorganic fillers.

3. The thermoplastic resin composition according to claim 1, wherein the polycarbonate resin has a weight average molecular weight (Mw) of about 10,000 g/mol to about 200,000 g/mol.

4. The thermoplastic resin composition according to claim 1, wherein the siloxane copolymer comprises about 30 mol% to about 50 mol% of the aryl group based on 100 mol% of the total substituents.

5. The thermoplastic resin composition according to claim 1, wherein the siloxane copolymer comprises poly(dialkylsiloxane-co-arylalkylsiloxane) and/or poly(dialkylsiloxane-co-diarylsiloxane).

6. The thermoplastic resin composition according to claim 1, wherein the aromatic sulfonic acid metal salt is represented by Formula 3:

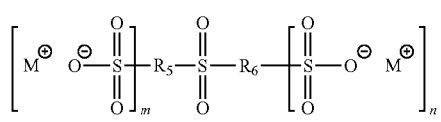

[Formula 3]

wherein in Formula 3, $R_5$ and $R_6$ are each independently a $C_1$ to $C_{20}$ hydrocarbon group; each M is independently lithium (Li), sodium (Na) or potassium (K); m is an integer of 0 to 6; and n is an integer of 1 to 6.

7. The thermoplastic resin composition according to claim 1, wherein the thermoplastic resin composition has a Vicat softening temperature of about 140° C. or more, as measured under conditions of a load of 5 kg and a heating rate of 50° C./hr in accordance with ISO R306.

8. A molded product produced from the thermoplastic resin composition according to claim 1.

9. The thermoplastic resin composition according to claim 2, comprising about 0.1 to about 1.5 parts by weight of the inorganic fillers.

10. The thermoplastic resin composition according to claim 4, wherein the siloxane copolymer comprises about 30 mol % to about 45 mol % of the aryl group based on 100 mol % of the total substituents.

* * * * *